United States Patent
Rolan et al.

(10) Patent No.: US 9,558,120 B2
(45) Date of Patent: Jan. 31, 2017

(54) METHOD, APPARATUS AND SYSTEM TO CACHE SETS OF TAGS OF AN OFF-DIE CACHE MEMORY

(71) Applicant: Intel Corporation, Santa Clara, CA (US)

(72) Inventors: Dyer Rolan, Verin (ES); Nevin Hyuseinova, Istanbul (TR); Blas A. Cuesta, Barcelona (ES); Qiong Cai, Barcelona (ES)

(73) Assignee: Intel Corporation, Santa Clara, CA (US)

(*) Notice: Subject to any disclaimer, the term of this patent is extended or adjusted under 35 U.S.C. 154(b) by 87 days.

(21) Appl. No.: 14/227,940

(22) Filed: Mar. 27, 2014

(65) Prior Publication Data
US 2015/0278096 A1 Oct. 1, 2015

(51) Int. Cl.
G06F 12/08 (2016.01)
G06F 12/12 (2016.01)

(52) U.S. Cl.
CPC ....... G06F 12/0833 (2013.01); G06F 12/0864 (2013.01); G06F 12/0871 (2013.01);
(Continued)

(58) Field of Classification Search
CPC .............. G06F 12/0833; G06F 12/0871; G06F 12/0864; G06F 12/123
(Continued)

(56) References Cited

U.S. PATENT DOCUMENTS 5,287,481 A * 2/1994 Lin ..................... G06F 12/0891
711/135
6,212,602 B1 4/2001 Wicki et al.
(Continued)

FOREIGN PATENT DOCUMENTS

| EP | 1274098 | 12/2005 |
|---|---|---|
| WO | WO-2013048497 | 4/2013 |
| WO | WO-2013095404 | 6/2013 |

OTHER PUBLICATIONS

International Search Report and Written Opinion of the International Searching Authority dated May 26, 2015, in International Patent Application No. PCT/US2015/017125, 14 pages.
(Continued)

Primary Examiner — Pierre-Michel Bataille
(74) Attorney, Agent, or Firm — Blakely, Sokoloff, Taylor & Zafman LLP

(57) ABSTRACT

Techniques and mechanism to provide a cache of cache tags in determining an access to cached data. In an embodiment, a tag storage stores a first set including tags associated with respective data locations of a cache memory. A cache of cache tags store a subset of tags stored by the tag storage. In response to any determination that a tag of the first set is to be stored to the cache of cache tags, all tags of the first set are stored to the first portion. Any storage of tags of the first set to the cache of cache tags includes storage of the tags of the first set to only a first portion of the cache of cache tags. In another embodiment, a replacement table is maintained for use in determining, based on an indicated level of activity for a set of the cache of cache tags, whether the set is to be selected for eviction and replacement of cached tags.

26 Claims, 9 Drawing Sheets

(52) U.S. Cl.
CPC ...... *G06F 12/123* (2013.01); *G06F 2212/604* (2013.01); *G06F 2212/62* (2013.01); *G06F 2212/69* (2013.01)

(58) Field of Classification Search
USPC .......................................... 711/135, 144, 145
See application file for complete search history.

(56) References Cited

U.S. PATENT DOCUMENTS

| | | | |
|---|---|---|---|
| 7,552,288 B2 | 6/2009 | Iyer et al. | |
| 8,250,300 B2 * | 8/2012 | Visalli ................. | G06F 12/0895 711/118 |
| 8,250,334 B2 | 8/2012 | Champagne et al. | |
| 8,458,447 B2 * | 6/2013 | Tran ...................... | G06F 9/3806 712/238 |
| 8,593,474 B2 | 11/2013 | Sabol | |
| 2003/0200389 A1 | 10/2003 | Odenwald, Jr. | |
| 2005/0071550 A1 | 3/2005 | Lowe et al. | |
| 2008/0086601 A1 * | 4/2008 | Gaither ................ | G06F 12/0824 711/141 |
| 2009/0006757 A1 | 1/2009 | Singhal et al. | |
| 2012/0016689 A1 | 1/2012 | Strawmyer et al. | |
| 2012/0290793 A1 | 11/2012 | Chung et al. | |
| 2013/0132675 A1 * | 5/2013 | Sleiman .............. | G06F 12/0844 711/118 |
| 2013/0275683 A1 | 10/2013 | Kacevas | |

OTHER PUBLICATIONS

Qureshi, et al., "The V-Way Cache: Demand Based Associativity via Global Replacement", Proceedings of the 32nd International Symposium on Computer Architecture (ISCA'05), 2005 IEEE, (2005), pp. 12.

International Preliminary Report on Patentability for PCT Patent Application No. PCT/US2015/017125, mailed Oct. 6, 2016, 10 pgs.

* cited by examiner

Tag Entry Configuration 200

| Original Tag | Original Index | Offset |
|---|---|---|

Tag Set 202

| | Tag | State Info |
|---|---|---|
| Way 0 | Tag | State Info |
| Way 1 | Tag | State Info |
| Way 2 | Tag | State Info |
| Way 3 | Tag | State Info |

CoCT Tag Set Entry 204

Contents/Data of Tag Set 206

| Original Tag – Way 0 | State Info |
|---|---|
| Original Tag – Way 1 | State Info |
| Original Tag – Way 2 | State Info |
| Original Tag – Way 3 | State Info |

Addressing of Tag Set 208

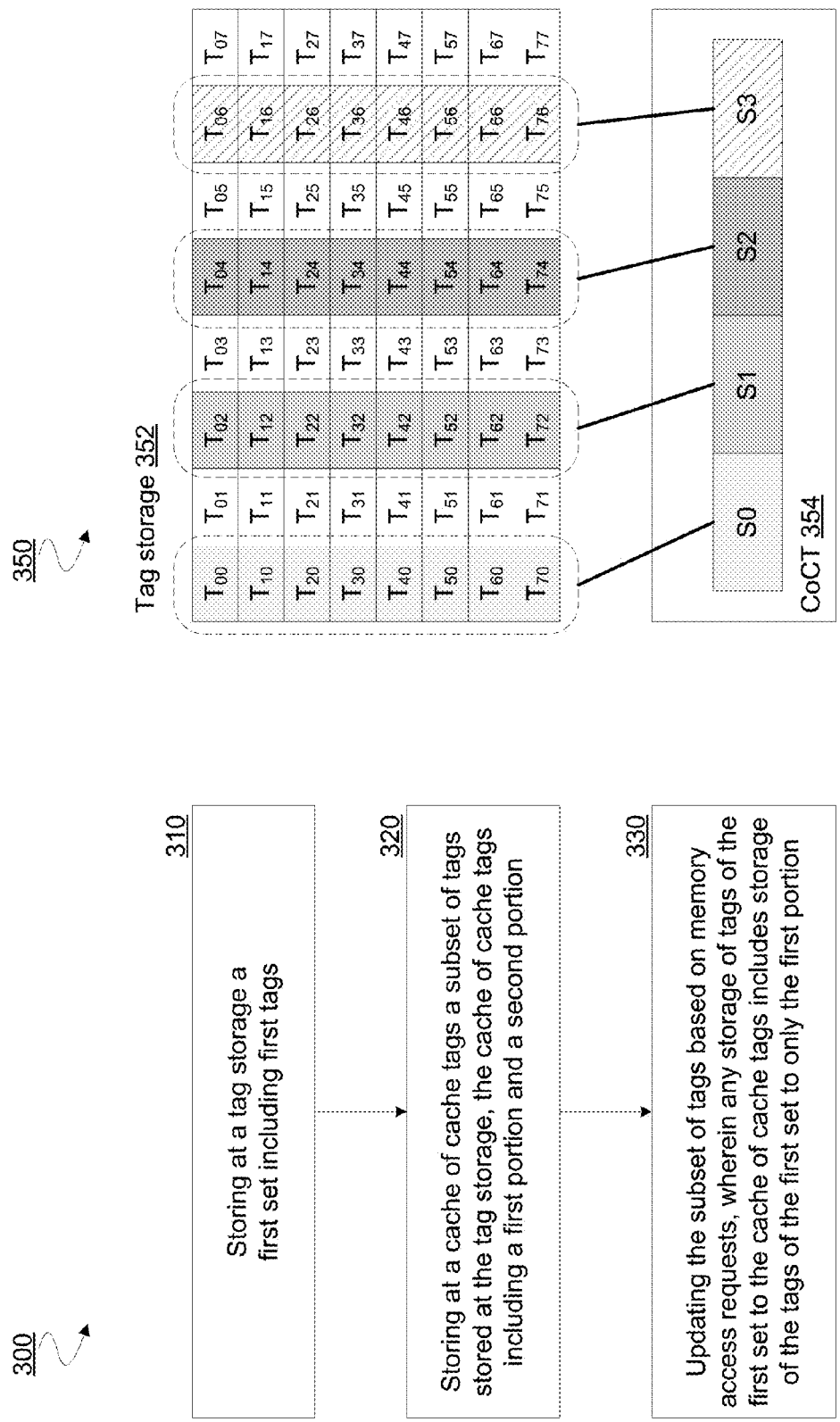

Tag storage 465

| Set0 | Set1 | Set2 | Set3 |
|---|---|---|---|
| $T_{00}$ | $T_{01}$ | $T_{02}$ | $T_{03}$ |
| $T_{10}$ | $T_{11}$ | $T_{12}$ | $T_{13}$ |
| $T_{20}$ | $T_{21}$ | $T_{22}$ | $T_{23}$ |
| $T_{30}$ | $T_{31}$ | $T_{32}$ | $T_{33}$ |

| Set4 | Set5 | Set6 | Set7 |
|---|---|---|---|
| $T_{04}$ | $T_{05}$ | $T_{06}$ | $T_{07}$ |
| $T_{14}$ | $T_{15}$ | $T_{16}$ | $T_{17}$ |
| $T_{24}$ | $T_{25}$ | $T_{26}$ | $T_{27}$ |
| $T_{34}$ | $T_{35}$ | $T_{36}$ | $T_{37}$ |

Time T1

Controller 470

RT 472

| 0 | 3 | 1 |
|---|---|---|

TC index 474

| 0 | 3 | 1 | 3 | 3 | 2 | 3 | 3 |
|---|---|---|---|---|---|---|---|

CoCT 480

| CSet0 | CSet1 | CSet2 |
|---|---|---|
| $T_{00}$ | $T_{02}$ | $T_{05}$ |
| $T_{10}$ | $T_{12}$ | $T_{15}$ |
| $T_{20}$ | $T_{22}$ | $T_{25}$ |
| $T_{30}$ | $T_{32}$ | $T_{35}$ |

Time T2

Controller 470

RT 472

| 1 | 3 | 1 |
|---|---|---|

TC index 474

| 0 | 3 | 3 | 1 | 3 | 2 | 3 | 3 |
|---|---|---|---|---|---|---|---|

CoCT 480

| CSet0 | CSet1 | CSet2 |
|---|---|---|
| $T_{00}$ | $T_{03}$ | $T_{05}$ |
| $T_{10}$ | $T_{13}$ | $T_{15}$ |
| $T_{20}$ | $T_{23}$ | $T_{25}$ |
| $T_{30}$ | $T_{33}$ | $T_{35}$ |

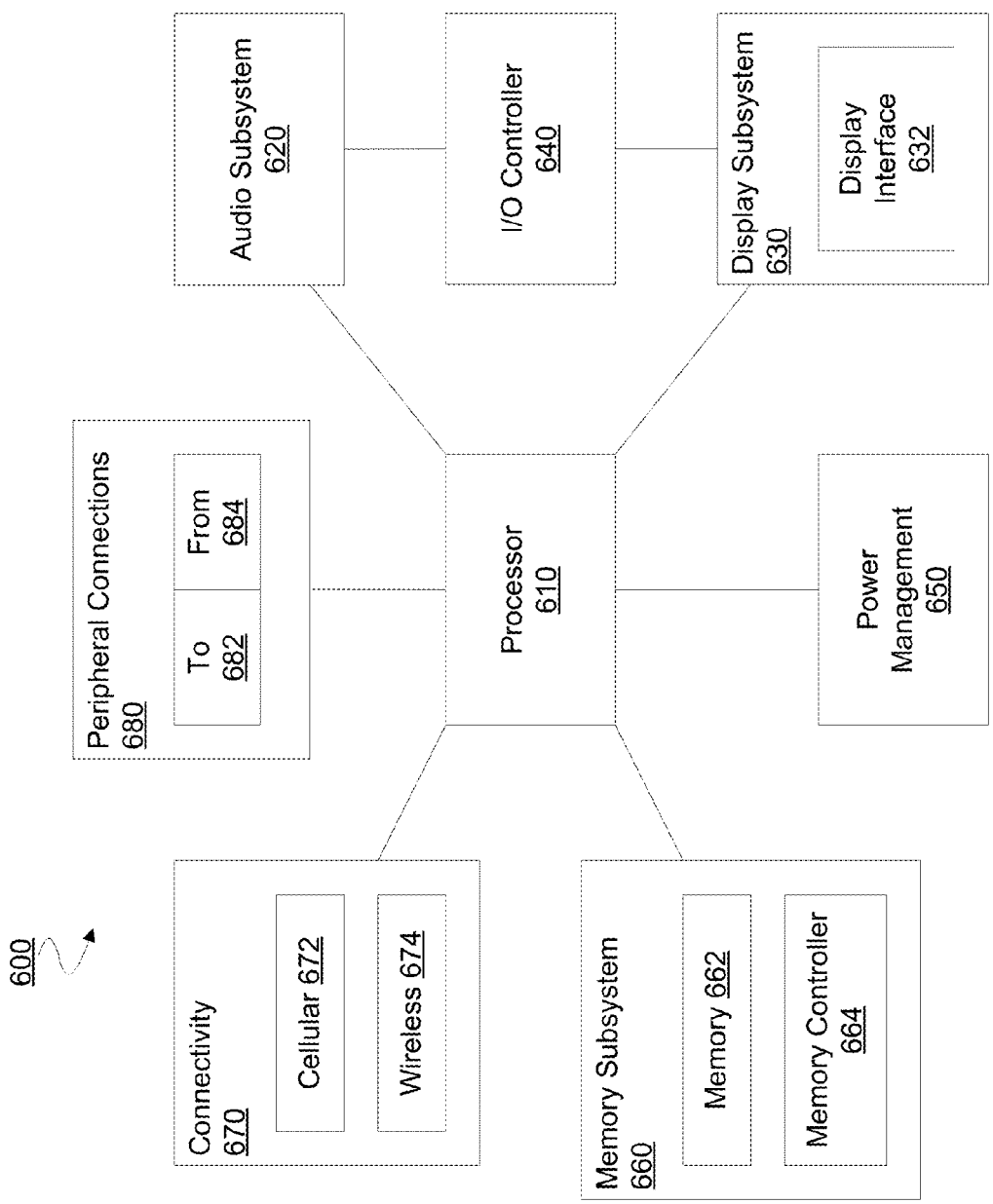

METHOD, APPARATUS AND SYSTEM TO CACHE SETS OF TAGS OF AN OFF-DIE CACHE MEMORY

BACKGROUND

1. Technical Field

The invention relates generally to cache tag storage. More specifically, certain embodiments relates to techniques for caching sets of tags of a tag storage.

2. Background Art

Processors of all kinds have become more dependent on caches due to the relatively slow speed of memory in relation to the speed of a processor core. Numerous cache architectures have been utilized for decades. One common cache architecture is a set associative cache. Cache architectures have memory storage that stores data from system memory locations as well as a tag storage structure that stores sets of tags.

In standard cache hierarchy architecture, the closer to the processor core(s) a cache is located, generally, the smaller and faster the cache becomes. The smallest and fastest cache(s) generally reside on the processor core silicon die. On the other hand, the largest cache (LLC or last level cache) or caches sometimes reside off-die from the processor core(s). Accessing data that resides in an off-die cache as opposed to an on-die cache generally creates additional latency since it takes longer for the data to be transmitted to the processor core(s).

Each cache has a tag storage structure. If the processor needs data from a certain memory location, it can determine if the data is stored in a given cache by doing a comparison of the memory location address and the tag storage structure for the cache. If the tag storage structure is off-die, the latency to do a tag lookup will be greater than if the tag storage structure is on-die. Thus, although on-die tag storage structures increase the cost of the processor die because they take up valuable space, they help speed up execution by reducing the latencies of tag lookups versus off-die caches.

BRIEF DESCRIPTION OF THE DRAWINGS

The various embodiments of the present invention are illustrated by way of example, and not by way of limitation, in the figures of the accompanying drawings and in which:

FIG. 3A is a flow diagram illustrating elements of a method to access a cache of cache tags according to an embodiment.

FIG. 3B is a block diagram illustrating elements of tag information to use in providing access to cached data according to an embodiment.

FIG. 4C is a block diagram illustrating elements of tag information to use in providing access to cached data according to an embodiment.

FIG. 6 is a block diagram illustrating elements of a mobile device to provide access to cached data according to an embodiment.

DETAILED DESCRIPTION

Embodiments of an apparatus, system, and method to implement a cache of cache tags are described. In the following description, numerous specific details are set forth. However, it is understood that embodiments may be practiced without these specific details. In other instances, well-known elements, specifications, and protocols have not been discussed in detail in order to avoid obscuring certain embodiments.

Figure 1:
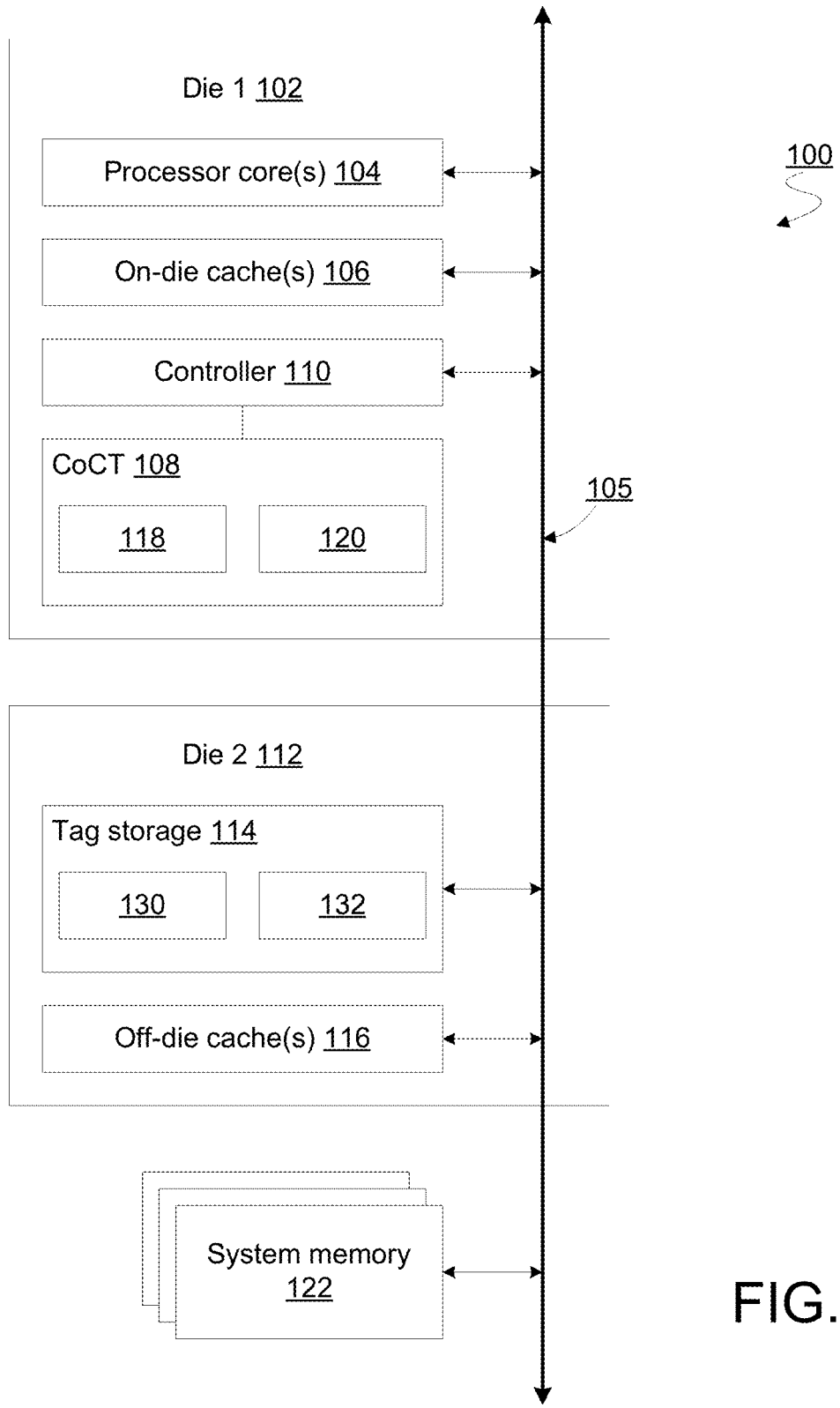
FIG. 1 is a functional block diagram illustrating elements of a system to cache tag information according to an embodiment.

FIG. 1 describes one embodiment of a system 100 to implement a cache of cache tags. One or more processor cores 104 may reside on a microprocessor silicon die, e.g. Die 1 102, in many embodiments. In other multiprocessor embodiments, there may be multiple processor dies coupled together, each including one or more cores per die (the architecture for processor cores on multiple dies is not shown in FIG. 1). Returning to FIG. 1, the processor core(s) may be coupled to an interconnect 105. In different embodiments, the processor core(s) 104 may be any type of central processing unit (CPU) designed for use in any form of personal computer, handheld device, server, workstation, or other computing device available today. The single interconnect 105 is shown for ease of explanation so as to not obscure the invention. In practice, this single interconnect 105 may be comprised of multiple interconnects coupling different individual devices together. Additionally, in many embodiments, more devices may be coupled to interconnect 105 that are not shown (e.g. a chipset).

The processor core(s) 104 may be coupled—e.g. through interconnect 105—to one or more on-die caches 106 physically located on the same die as the processor core(s) 104. In many embodiments, a cache has a tag storage 114 associated with it that stores tags for all cache memory locations. In many embodiments, tag storage 114 resides on a separate silicon die, e.g. Die 2 112, from the processor core(s) 104. In many embodiments, tag storage 114 is coupled to one or more off-die (non-processor die) cache(s) 116—e.g. through interconnect 105—and is located on the same die as off-die cache(s) 116.

A cache of cache tags (CoCT) 108 may store a subset of the off-die cache tags on processor die 102. Specifically, while tag storage 114 stores all index values and associated tag sets per index value, CoCT 108, on the other hand, may not store all possible index values. Rather, to save on storage space, CoCT 108 may store merely a subset of the tags stored in tag storage 114. In some embodiments, not all index locations are represented at any given time in CoCT 108.

In some embodiments, a controller 110 controlling the access to CoCT 108 determines when a memory request matches a tag that is currently located within CoCT 108 and reports this back to the processor. In different embodiments, the memory request may originate from one of a number of devices in the system, such as one of the processor cores or a bus master I/O device among other possible memory request originators. Memory access requests may each include a respective address to a specific location within system memory 122. Tag storage 114 may include all tag sets associated with specific locations in the off-die cache(s) 116.

Thus, when a memory request is received by the controller 110, the controller 110 may parse out an index field (e.g. including a pointer to or identifier of a set) and a tag field in the memory request address and may then check to see if the index of the tag associated with the specific memory location is stored within the cache-of-cache tags 108. If the original index is stored, then the controller 110 may check if the original tag associated with the memory location is stored within CoCT 108 in one of the ways at the original index location. If the original tag is located in an entry of CoCT 108 associated with the original index location, then the result is that the memory request is a cache of cache tags 108 tag hit (i.e. cache hit). If the original tag is not stored at any such entry of CoCT 108, then the result is that the memory request is a cache of cache tags 108 tag miss. This is also a particular type of cache miss, referred to herein as a set miss, if the tags from all ways of a given set are cached in CoCT 108.

On the other hand, if the controller 110 does not find the original index stored in CoCT 108 on initial lookup, the result is that the memory request is a cache of cache tags 108 index miss. In this case, the controller 110 must fetch and then insert the original index value from the memory request into CoCT 108 by replacing an index currently stored in CoCT 108. In some embodiments, where CoCT 108 is itself an associative cache, a replacement policy may be a least recently used policy, where the least recently used index value is replaced. In other embodiments, other standard replacement policy schemes may be utilized to replace the index value in CoCT 108.

Once the new index value has been inserted into CoCT 108, then the controller 110 may determine if the specific tag associated with the memory request is currently stored in tag storage 114 at the index location. If so, then the result is a tag hit in tag storage 114 and the controller 110 may input tag information into CoCT 108 at the new index position for all ways stored in tag storage 114 at the index position.

Otherwise, the result is a tag miss in tag storage 114 and the controller 110 needs to initiate the replacement of the least recently used tag (in one of the ways at the index location in tag storage 114) with the tag associated with the memory request. This replacement inputs the data located at the address of the memory request from system memory into the cache memory and inputs the original tag from the memory request into tag storage 114. Once the tag is input into the tag storage 114 from system memory 122, then, in some embodiments, the controller 110 may initiate the replacement of all ways in CoCT 108 (at the index value) with the tags from each way at the index value that are currently stored in tag storage 114.

In some embodiments, the cache memory is a sectored cache. In sectored cache embodiments, the overall tag storage requirements in tag storage 114 are lessened because each tag is shared by multiple cache entries (e.g. cache sub-blocks). In these sectored cache embodiments, the storage requirements for state information is increased because, for each tag, there must be state information for each potential entry associated with the tag (state information is discussed in the background section as well as in the discussion related to FIG. 2). For example, if a tag is 14 bits, in a non-sectored cache, 2-bits of state information would be included per sector. In a sectored cache having 8 sectors per-way, there are 8 cache entries associated with each tag, thus, there would need to be 16-bits (2-bits·8) of state information included per tag. In this example, the state information takes up more space than the tag information.

In one illustrative scenario according to one embodiment, the storage requirements of a set are 8.5 Bytes, which includes tag information, state information, eviction/cache replacement policy (RP) information. In some embodiments, the cache of cache tags utilizes a replacement policy that a least recently used (LRU), or other, policy. Specifically, the following information would be stored in a cache of cache tags set:

(14-bit tag+2-bit state)·4 ways+4-bit RP information=8.5 Bytes

To store 2K ($2^{11}$) sets in CoCT 108 in such a scenario, the storage requirement would then be 17K (2K*8.5 B). The specifics of the entries in the cache of cache tags is discussed in reference to FIG. 2 below. Thus, an embodiment of a cache of cache tags can reside on the processor die to perform lookups of the most recently used tags and the burden to the die is 17K. A 17K storage size cost on-die is a much smaller storage burden than the 8.5 M size of a full tag storage structure.

Although certain embodiments are not limited in this regard, different portions of CoCT 108 may be dedicated—at least with respect to the caching of tags—to different respective sets of tags stored in tag storage 114. By way of illustration and not limitation, CoCT 108 may include respective portions 118, 120, and tag storage 114 may include one or more sets of tags 130 and one or more sets of tags 132. In such an embodiment, configuration state of controller 110 may define or otherwise indicate that, of portions 118, 120, any tag caching for the one or more sets 130 by CoCT 108 is to be performed only with portion 118 (for example). Similarly, controller 110 may implement caching wherein, of portions 118, 120, any tag caching for the one or more sets 132 by CoCT 108 may be performed only with portion 120.

Alternatively or in addition, CoCT 108 may itself be an N-way set associative cache. In such embodiments, tags of tag storage 114 may be cached to CoCT 108 on a per-set basis—e.g. wherein, for some or all sets of tag storage 114, any caching of a tag of a given set to CoCT 108 is part of a caching of all tags of that set to CoCT 108. Similarly, for some or all sets of tag storage 114, any eviction of a tag of a given set from CoCT 108 may be part of an eviction of all tags of that set from CoCT 108.

Figure 2:
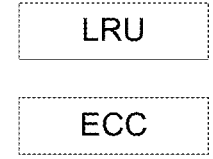
FIG. 2 illustrates features of a tag storage and a cache of cache tags to provide access to cached data according to an embodiment.
Figure 2:
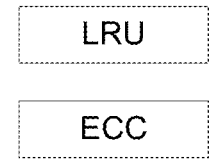
Figure 2:
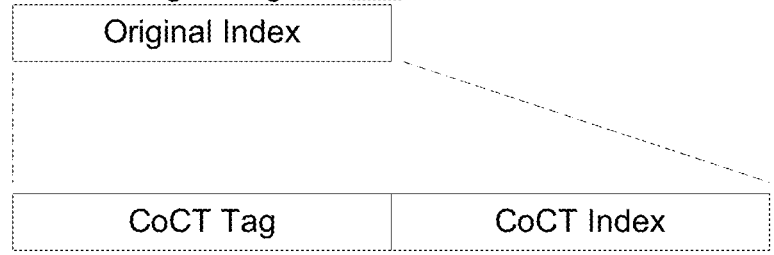

FIG. 2 illustrates features of a tag address structure, a cache of cache tags set structure and an individual tag address entry of the cache of cache tags in a N-way set associative configuration according to one embodiment.

In an illustrative embodiment, a memory access request to a 40-bit (for example) address space may include the following pieces of information in a 40-bit address field: an original tag field, an original index field, and an offset field. Typically, only the original tag field is stored within a tag entry 200 stored in the tag storage structure. Using the 40-bit addressing example with a 64 Byte cache line size in a direct-mapped (1-way associative) cache of 256 M, an example of the size of each field in the address might include a 12-bit original tag, a 22-bit index, and a 6-bit offset. The 22-bit index field may be a pointer to a specific indexed location in the tag storage structure. The 12-bit original tag may be the highest 12 bits of the actual memory address. The size of the tag may be also determined by its associativity and cache line size. For example, a 256 MB 4-way set associative cache with 64 Byte cache lines may have a 20-bit index field and 4 M tags ($2^{20} \cdot 4$), where each tag is 14 bits in size.

FIG. 2 also illustrates an embodiment of a tag set 202. The tag set 202 for a 4-way set associative cache stores four tags. Each way (Way 0-Way 3) may store a specific tag as well as a specific amount of state information related to the cache entry associated with the each tag. State information may be specific per tag, thus, there may need to be state information bits associated with each tag. Additionally, the tag set also may need to include the cache replacement policy information, such as LRU bits or other LRU-type information, to inform the controller which of the four tags is due for eviction when a new tag may need to be stored. Although certain embodiments are not limited in this regard, error correction code (ECC) bits may also be utilized per set to minimize the storage errors of the tag set.

FIG. 2 also describes an embodiment of a tag set entry stored within a cache of cache tags (CoCT Tag Set Entry 204). Set associative caches are generally popular for many types of cache configurations. Thus, in many embodiments, the cache is a multi-way set associative cache. Therefore, an entry in the cache of cache tags may need to store tag information for all ways of the cache at the particular index location (Contents/Data of Tag Set 206). In these embodiments, the index field (Addressing of Tag Set 208) from the original address (e.g. the 40-bit address configuration as discussed above) may point to the location of a set of tags stored within the cache of cache tags. In some embodiments, the cache of cache tags structure itself is also stored in a set associative manner. Thus, the original index field may be divided up into a cache of cache tags tag field as well as a cache of cache tags index field to allow for fetching a set within the cache of cache tags. For example, using a 20-bit original index field from the 40-bit address, the upper 12 bits of the original index field may be utilized as the tag field in a set associative cache of cache tags. In this example, the lower 8 bits of the original index field may be utilized as the index field in a cache of cache tags.

FIG. 3A illustrates elements of a method 300 for maintaining a cache of cache tags according to an embodiment. Method 300 may be performed to keep CoCT 108 up-to-date, for example, based on memory access requests from a processor such as one or more processor cores 104. In an embodiment, method 300 is performed with controller 110.

Figure 3C:
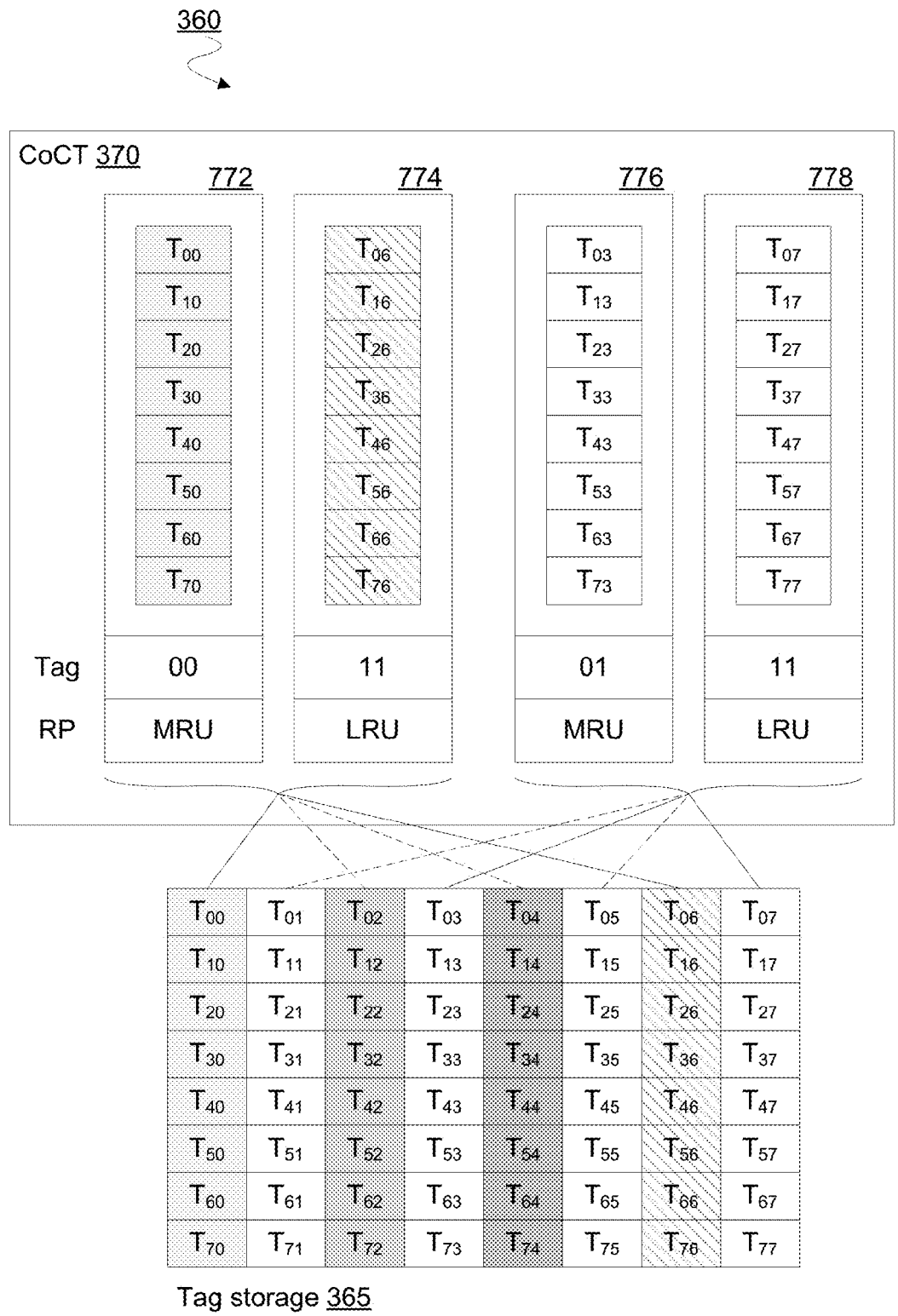
FIG. 3C is a block diagram illustrating elements of tag information to use in providing access to cached data according to an embodiment.

Method 300 may include, at 310, storing at a tag storage a set including first tags. The first tags may each be associated with a respective data location of a cache memory—e.g. off-die cache(s) 116. By way of illustration and not limitation, FIG. 3B shows an illustrative system 350 according to one embodiment. In system 350, a tag storage 352 includes eight sets each comprising eight respective ways. Each such way may store a respective tag, wherein a tag T of an ith way of a jth set of tag storage 352 is indicated in herein by the label $T_{ij}$. Each such tag $T_{ij}$ of tag storage 352 may correspond to a respective location of data stored in a cache memory (not shown). As further illustrated in FIG. 3C, a system 360 according to another embodiment may include a tag storage 365 having, for example, some or all of the features of tag storage 352. Certain embodiments are not limited with respect to the number of sets stored to a data storage and/or with respect to a total number of ways in a given set. Also, it is understood that a way of a set in a tag storage may include other information in addition to a tag—e.g. as discussed herein with respect to FIG. 2.

Method 300 may further include, at 320, storing at a cache of cache tags a subset of tags stored at the tag storage. For example, a cache of cache tags CoCT 354 of system 350 may include one or more sets—as represented by the illustrative sets S0, S1, S2, S3—each to store the tags of a respective one of the eight sets of tag storage 352. At a given time, CoCT 354 may store the tags of only some of the eight sets of tag storage 352. In the embodiment of system 360, a CoCT 370 includes one or more sets—as represented by the illustrative sets 772, 774, 776, 778—each to store the tags of a respective one of the eight sets of tag storage 365. Similar to CoCT 354, CoCT 370 may, of the eight sets of tag storage 365, store the tags of only some of these sets.

The cache of cache tags may include a first portion and a second portion including different respective cache storage locations—e.g. arranged as respective one or more sets. In such an embodiment, the first portion and the second portion may, at least with respect to storing tags of the tag storage, be dedicated to different respective sets of the tag storage. Dedicating different portions of the CoCT to different respective sets of the tag storage may reduce the total cache storage locations of the CoCT to be searched to identify the occurrence (or absence) of a hit event.

For example, method 300 may further comprise, at 330, updating the subset of tags based on memory access requests from the processor, wherein any storage of tags of the first set to the cache of cache tags includes storage of the tags of the first set to only the first portion. By way of illustration and not limitation, system 350 may be an embodiment wherein controller logic (not shown), such as that to perform method 400, dedicates one or more sets of CoCT 354—e.g. some or all of the illustrative sets S1, S2, S3, S4—each to store tags of only a respective one of the eight sets of tag storage 350. Mapping information or other configuration state of such a controller may define or otherwise indicate that tag storage by S0 is only for tags $T_{00}, T_{10}, \ldots T_{70}$ of a set 0, that tag storage by S1 is only for tags $T_{02}, T_{12}, \ldots T_{72}$ of a set 2, that tag storage by S2 is only for tags $T_{04}, T_{14}, \ldots T_{74}$ of a set 4 and/or that tag storage by S3 is only for tags $T_{06}, T_{16}, \ldots T_{76}$ of a set 6. Such dedication of S0 (or other set of CoCT 354) to a particular set of tag storage 352 may be permanent for "static" (e.g. constant) tracking with S0 of that particular set of tag storage 352.

In the other illustrative embodiment of system 360, controller logic (not shown), such as that to perform method 300, provides a set of CoCT 370—e.g. one of the illustrative sets 772, 774, 776, 778—to store at different times tags of different sets of tag storage 365. By way of illustration and not limitation, associative mapping or other such functionality of the controller logic may provide that sets 772, 774 are each available to store tags of only a first plurality of sets of tag storage 365—as represented by the illustrative "even" sets 0, 2, 4, 6 of tag storage 365. Alternatively or in addition, sets 776, 778 may each be available to store tags of only a second plurality of sets of tag storage 365—e.g. the illustrative "odd" sets 1, 3, 5, 7 of tag storage 365. Different embodiments may provide any of various other associative mappings of CoCT portions (e.g. sets) to different respective sets of a tag storage.

In an illustrative scenario for the embodiment of system 360, set 772 may, at a given point in time illustrated with FIG. 3C, store tags $T_{00}, T_{10}, \ldots T_{70}$ and a tag value "00" indicating that set 772 is currently storing tags of the 0th set of the even sets for which set 772 is available. Concurrently, set 774 may store tags $T_{06}, T_{16}, \ldots T_{76}$ of a set 6 and a tag value "11" indicating that set 774 is currently storing tags of the 3rd set (which is the 6th set of all eight sets of tag storage 365) of the odd sets for which set 774 is available. Furthermore, set 776 may store tags $T_{03}, T_{13}, \ldots T_{73}$ and a tag value "01" indicating that tags of the 1st set of the odd sets (the 3rd of all eight sets of tag storage 365) are currently stored by set 776. Concurrently, set 778 may store tags $T_{07}, T_{17}, \ldots T_{77}$ and a tag value "11" indicating that tags of the 3rd set of the odd sets (the 7th of all eight sets of tag storage 365) are currently stored by set 778.

In an embodiment, sets 772, 774 each further store respective replacement policy (RP) information which, for example, indicates whether the corresponding set is the most recently used (MRU) or the least recently used (LRU) of sets 772, 774. Such RP information may be used by the controller to determine—e.g. in response to a memory request targeting a tag of an uncached even set of tag storage 365—which of sets 772, 774 is to be selected for eviction of tags and storage of tags of the uncached even set. Based on such selection, the tag information of the selected set may be updated with an identifier of the newly-cached even set, and the RP information of sets 772, 774 may be updated to reflect that the selected one of sets 772, 774 is now the MRU set.

Similarly, sets 776, 778 may each further store respective RP information which indicates whether the corresponding set is the MRU or the LRU of sets 776, 778. Such RP information may be used to determine—e.g. in response to a memory request targeting a tag of an uncached odd set of tag storage 365—which of sets 776, 778 is to be selected for eviction of tags and storage of tags of the uncached odd set. Based on such selection, the tag information of the selected set may be updated with an identifier of the newly-cached odd set, and the RP information of sets 776, 778 may be updated to reflect that the selected one of sets 776, 778 is now the MRU set.

In some embodiments, method 300 stores all tags of a set to the cache of cache tags on a per-set basis. For example, controller logic performing method 300 may provide that, in response to any determination that a tag of the first set is to be stored to the cache of cache tags, all tags of the first set are stored to the first portion of the CoCT. In an embodiment, the tag storage may further store a second set including second tags each associated with a respective data location stored within the cache memory. Controller logic performing method 300 may further provide that any storage of tags of the second set to the cache of cache tags by the controller includes storage of the tags of the second set to only the second portion of the CoCT. Alternatively or in addition, such controller logic may provide that, in response to any determination that a tag of a second set is to be stored to the cache of cache tags, all tags of the second set are stored to the second portion of the cache of cache tags.

Figure 4A:
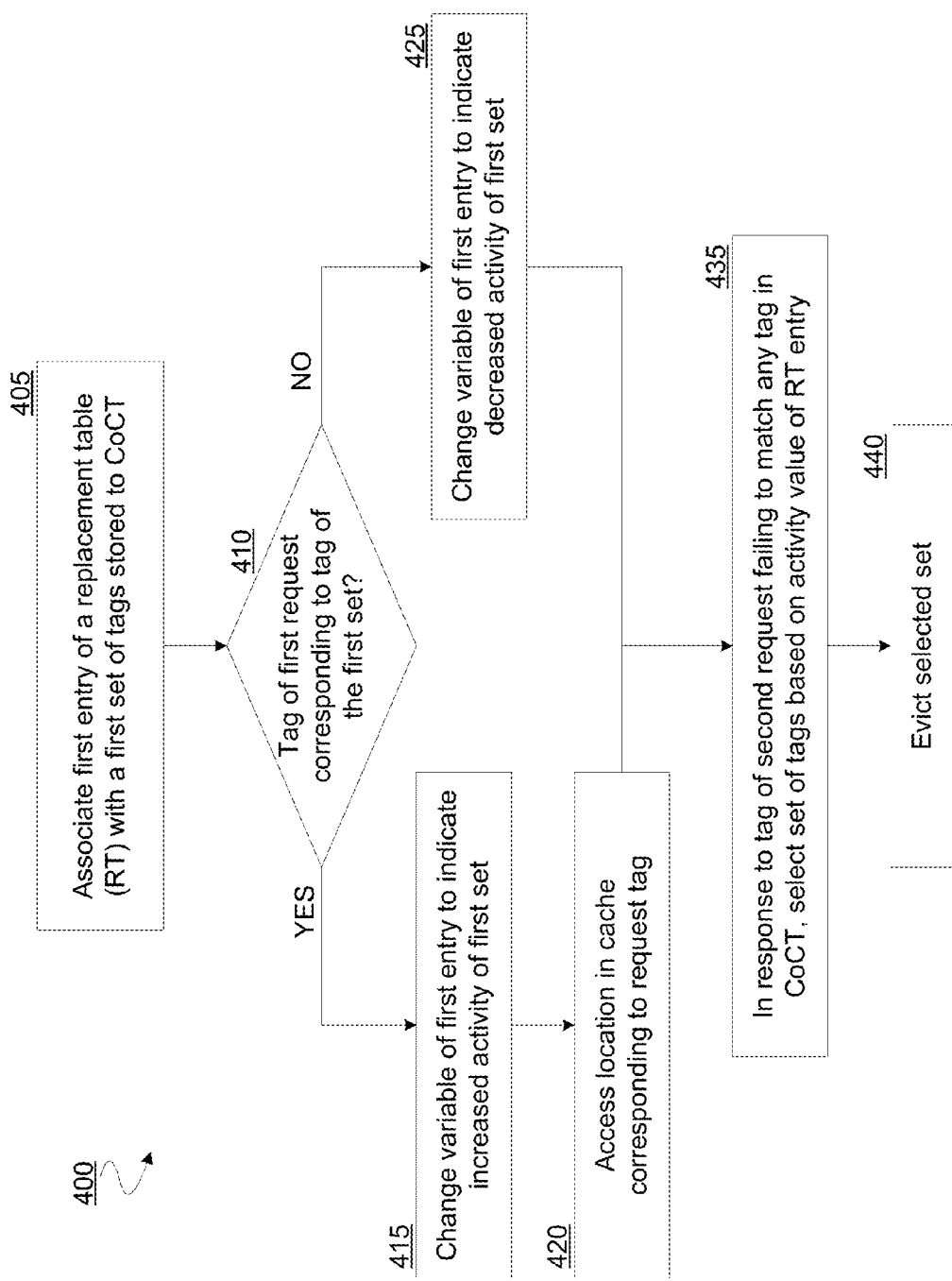
FIG. 4A is a flow diagram illustrating elements of a method for maintaining a cache of cache tags according to an embodiment.
Figure 4B:
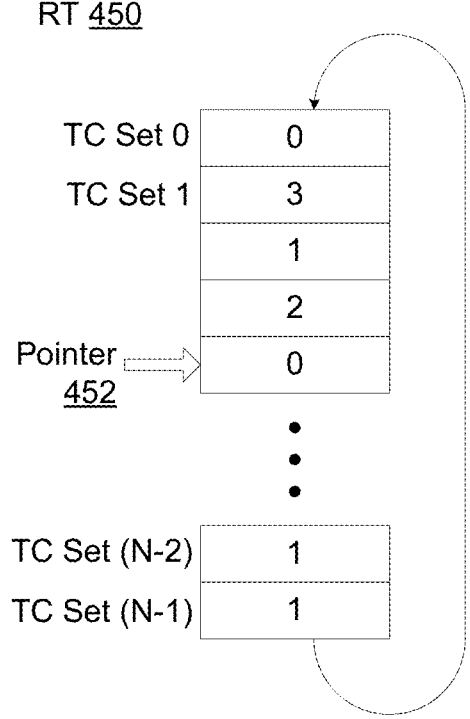
FIG. 4B illustrates elements of replacement table and a state diagram to use in maintaining a cache of cache tags according to an embodiment.
Figure 4B:
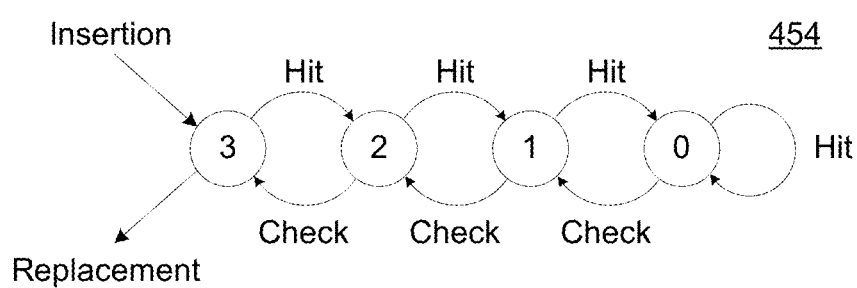

As illustrated in FIGS. 4A-4C, controller logic according to certain embodiments may maintain a data structure—referred to herein as a replacement table—for use as a reference to determine, for a plurality of sets of cached tags, which set of tags is to be selected for eviction from a cache of cache tags (e.g. to allow for subsequent storing of a replacement set of tags to the cache of cache tags). Such eviction may be performed, for example, in response to a memory access request comprising a tag which cannot be matched with any tag currently stored in the cache of cache tags and where the tag's set is not currently tracked in the CoCT.

FIG. 4A illustrates elements of a method 400 for accessing a cache of cache tags according to an embodiment. Method 400 may be performed by controller logic such as that of controller 110, for example. Although certain embodiments are not limited in this regard, method 400 may be performed as part of, or in addition to, method 300 for maintaining a cache of cache tags.

Method 400 may include, at 405, associating a first entry of a replacement table with a first set of tags stored to a cache of cache tags. In an embodiment, the associating at 405 may be performed in response to storage of the first set of tags to the cache of cache tags. The associating at 405 may include setting an activity variable of the first entry to an initial value of a pre-determined plurality of values.

By way of illustration and not limitation, FIG. 4B illustrates a replacement table RT 450, according to one embodiment, for a cache of cache tags (not shown) which includes N tag cache (TC) sets $0, 1, \ldots, (N-2), (N-1)$. Over time, the TC sets may be variously allocated each to store the tags of a respective tag set of a tag storage (not shown). FIG. 4B also shows an illustrative state diagram 454 which may be used to determine, for a given entry of RT 450, which of a pre-determined plurality of values to assign to an activity variable of that entry. Although certain embodiments are not limited in this regard, state diagram 454 may include a predetermined plurality of four values 0 through 3. An activity variable of an RT entry may updated to reflect higher activity in response to successive memory requests which each hit (match) a respective tag of the corresponding cached tag set. Alternatively or in addition, such an activity variable may be updated to reflect lower activity if a memory request does not hit any tag of the cached tag set.

For example, method 400 may determine, at 410, whether (or not) a tag of a first memory access request corresponds to (e.g. matches) a tag of the first set of tags. In response to the evaluation at 410 determining that the tag of the first memory access request corresponds to such a cached tag, method 400 may, at 415, change a variable of the first entry to indicate increased activity of the first set. Method 400 may further service the first request, as indicated at 420 by operations to access a location in cache memory which corresponds to the tag of the first memory access request. Otherwise, method 400 may, at 425, change the variable of the first entry to indicate decreased activity of the first set.

Subsequent to the first memory access request, a second memory access request may be issued from a host processor or other such requestor logic. The second memory access request may target a memory location which is not currently represented in the cache of cache tags. For example, controller logic may evaluate a tag which is included in the second memory access request to determine whether the tag matches any tag stored or otherwise tracked in the cache of cache tags—e.g. to detect for a set miss event. In response to a failure to identify any such matching cached tag, method 400 may, at 435, select a set of tags based on an activity value of a corresponding entry of the replacement table. For example, a pointer 452 may be moved—e.g. as a background process prior to, during or in response to the determining at 410—to successively check entries of RT 450 to identify an activity variable which indicates a sufficiently low level of activity. By way of illustration and not limitation, the selecting at 435 may include searching the replacement table for an activity variable which is equal to the initial value (e.g. a value to which the activity variable of the first entry was set at 405). As illustrated by state diagram 454, a cached set of tags may be selected for replacement where it is identified as indicating a lowest—or otherwise sufficiently low—activity level (e.g. the value 3) of the predetermined plurality of such levels. Method 400 may then evict the selected set of tags from the cache of cache tags, at 440.

FIG. 4C illustrates a system 460 which, according to an embodiment, is operated according to techniques including some or all of the features of method 400. System 460 includes a tag storage 465 to store sets of tags, as represented by the illustrative eight sets Set0, ..., Set7. Although certain embodiments are not limited in this regard, the eight sets of tag storage 465 may each comprise four respective ways which, in turn, each include a respective tag for a corresponding location in a cache memory (not shown).

System 460 may further comprise a cache of cache tags CoCT 480 which, in an illustrative embodiment, includes three sets CSet0, CSet1, CSet2. At a given time, CSet0, CSet1, CSet2 may be variously allocated each to store the tags of a respective one of Set0, ..., Set7. For example, a controller 470 of system 460 may maintain a tag cache (TC) index 474 including entries each corresponding to a different respective one of Set0, ..., Set7. Based on the processing of memory access requests, controller 470 may variously store to entries of TC index 474 values each defining or otherwise indicating which, if any, of CSet0, CSet1, CSet2 currently stores the tags of the corresponding one of Set0, ..., Set7. For example, at a time T1, values 0, 1, 2 are variously stored in corresponding entries of TC index 474 to indicate that the tags of Set0, Set2 and Set5 are stored, respectively, at CSet0, CSet1, CSet2. In such an embodiment, the value 3 in an entry of TC index 474 may indicate that tags of a corresponding one of Set0, ..., Set7 are not currently stored in CoCT 480.

Controller 470 may further maintain a replacement table RT 472 to serve as a reference to select one of CSet0, CSet1, CSet2 for evicting tags of one set and for storing tags of a next set of tag storage 465. RT 472 may include entries each to store a respective variable indicating a level of activity of a corresponding one of CSet0, CSet1, CSet2. Entries of RT 472 may be maintained according to state diagram 454, although certain embodiments are not limited in this regard. For example, at time T1, RT 472 indicates for CSet0, CSet1, CSet2 respective activity levels 0, 3, 1. Accordingly, CSet1 may—at time T1—qualify to be selected for eviction of the tags of Set2 form CoCT 480. Such tag eviction may be subsequently implemented in response to a memory access request which does not hit any of the tags of Set0, Set2 and Set5 currently cached to CoCT 480. For example, a next memory access request may include one of the tags $T_{03}$, $T_{13}$, $T_{23}$, $T_{33}$ of Set3. Results of such a memory access request are illustrated in FIG. 4C for a time T2 subsequent to time T1.

For example, at time T2, RT 472 may be updated to indicate a lower level activity of CSet0—e.g. where an activity variable of an entry corresponding to CSet0 is changed from 0 to 1. However, an entry of RT 472 corresponding to CSet1 may remain at some lowest level (such as the illustrative level 3) since the newly-cached tags of Set3 are initially qualified for a subsequent eviction. Selection of CSet1 for tag eviction may preclude a checking (and updating) of the entry of RE 472 which corresponds to CSet2. In an embodiment, TC index 474 is updated to reflect that CSet0, CSet1 and CSet2 store tags of Set0, Set3, Set5, respectively.

Figure 5:
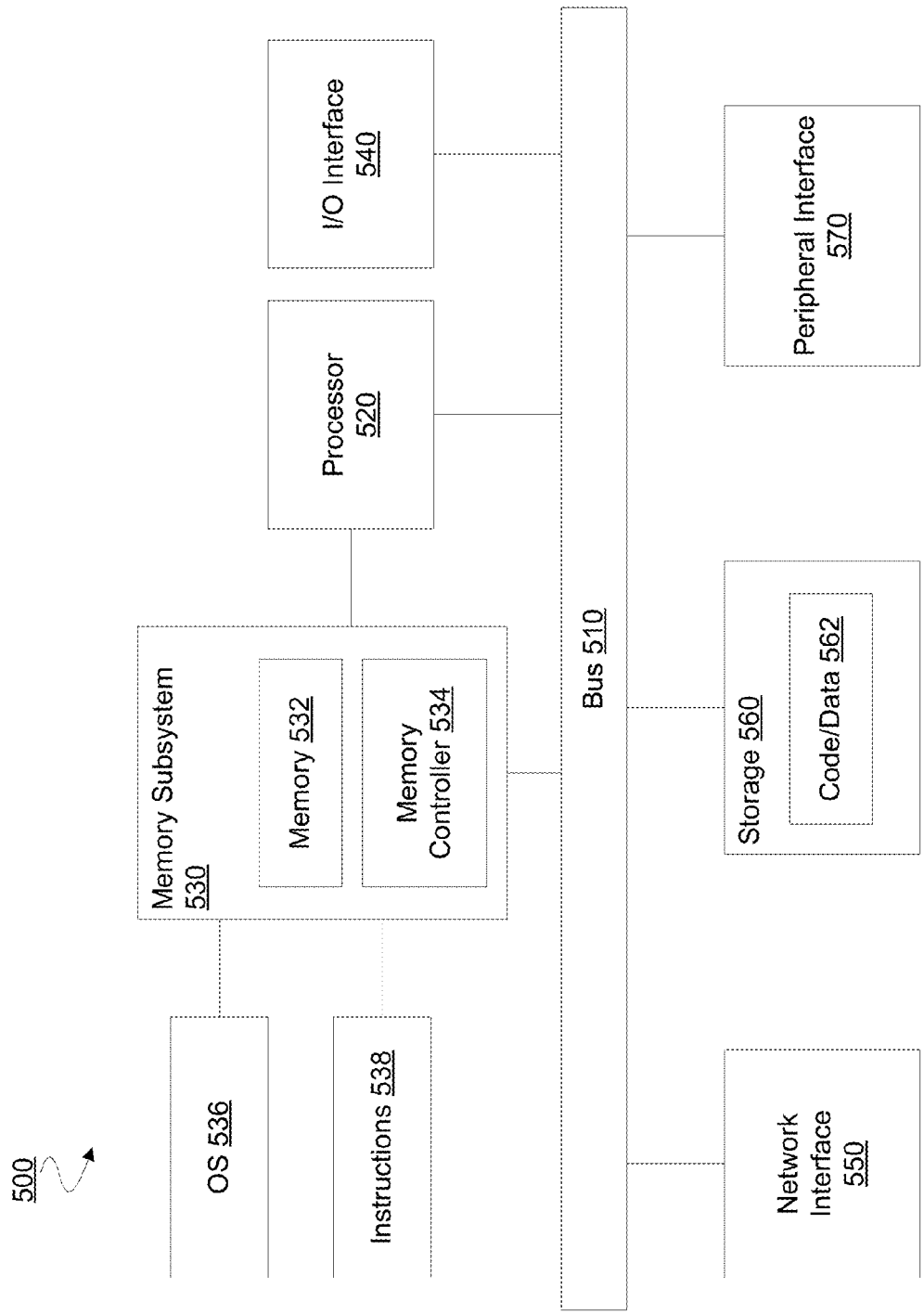
FIG. 5 is a block diagram illustrating elements of a computer system to provide access to cached data according to an embodiment.

FIG. 5 is a block diagram of an embodiment of a computing system in which memory accesses may be implemented. System 500 represents a computing device in accordance with any embodiment described herein, and may be a laptop computer, a desktop computer, a server, a gaming or entertainment control system, a scanner, copier, printer, or other electronic device. System 500 may include processor 520, which provides processing, operation management, and execution of instructions for system 500. Processor 520 may include any type of microprocessor, central processing unit (CPU), processing core, or other processing hardware to provide processing for system 500. Processor 520 controls the overall operation of system 500, and may be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 530 represents the main memory of system 500, and provides temporary storage for code to be executed by processor 520, or data values to be used in executing a routine. Memory subsystem 530 may include one or more memory devices such as read-only memory (ROM), flash memory, one or more varieties of random access memory (RAM), or other memory devices, or a combination of such devices. Memory subsystem 530 stores and hosts, among other things, operating system (OS) 536 to provide a software platform for execution of instructions in system 500. Additionally, other instructions 538 are stored and executed from memory subsystem 530 to provide the logic and the processing of system 500. OS 536 and instructions 538 are executed by processor 520.

Memory subsystem 530 may include memory device 532 where it stores data, instructions, programs, or other items. In one embodiment, memory subsystem includes memory controller 534, which is a memory controller in accordance with any embodiment described herein, and which provides mechanisms for accessing memory device 532. In one embodiment, memory controller 534 provides commands to access memory device 532.

In some embodiments, system 500 comprises two levels of memory (alternatively referred to herein as '2LM') that include cached subsets of system disk level storage (in addition to run-time data, for example). This main memory may include a first level (alternatively referred to herein as "near memory") comprising relatively small, fast memory made of, for example, DRAM; and a second level (alternatively referred to herein as "far memory") which comprises relatively larger and slower (with respect to the near memory) volatile memory (e.g., DRAM) or nonvolatile memory storage—e.g., including phase change memory (PCM), a three dimensional cross point memory, a resistive memory, nanowire memory, ferro-electric transistor random access memory (FeTRAM), magnetoresistive random access memory (MRAM) memory that incorporates memristor technology, spin transfer torque (STT)-MRAM and/or the like. Far memory may be presented as "main memory" to a host operating system (OS) executing with processor 520, where the near memory is a cache for the far memory that, for example, is transparent to the OS. Management of the two-level memory may be done by a combination of controller logic and modules executed via the host central processing unit (CPU).

For example, memory controller 534 may control access by processor 520 to far memory—e.g. included in some or all of memory 532 may serve as a far memory for processor 520, where memory controller 534 operates as far memory control logic. In such an embodiment, processor 520 may include or couple to a near memory controller logic to access a near memory (not shown)—e.g. other than memory 532—and 2LM controller logic coupled thereto. Such 2LM controller logic may include a CoCT and manager logic to maintain the CoCT according to techniques discussed herein. Near memory may be coupled to processor 520 via high bandwidth, low latency means for efficient processing.

Far memory may be coupled to processor 520 via low bandwidth, high latency means (as compared to that of the near memory).

Processor 520 and memory subsystem 530 are coupled to bus/bus system 510. Bus 510 is an abstraction that represents any one or more separate physical buses, communication lines/interfaces, and/or point-to-point connections, connected by appropriate bridges, adapters, and/or controllers. Therefore, bus 510 may include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 510 may also correspond to interfaces in network interface 550.

System 500 may also include one or more input/output (I/O) interface(s) 540, network interface 550, one or more internal mass storage device(s) 560, and peripheral interface 570 coupled to bus 510. I/O interface 540 may include one or more interface components through which a user interacts with system 500 (e.g., video, audio, and/or alphanumeric interfacing). Network interface 550 provides system 500 the ability to communicate with remote devices (e.g., servers, other computing devices) over one or more networks. Network interface 550 may include an Ethernet adapter, wireless interconnection components, USB (universal serial bus), or other wired or wireless standards-based or proprietary interfaces.

Storage 560 may be or include any conventional medium for storing large amounts of data in a nonvolatile manner, such as one or more magnetic, solid state, or optical based disks, or a combination. Storage 560 holds code or instructions and data 562 in a persistent state (i.e., the value is retained despite interruption of power to system 500). Storage 560 may be generically considered to be a "memory," although memory 530 is the executing or operating memory to provide instructions to processor 520. Whereas storage 560 is nonvolatile, memory 530 may include volatile memory (i.e., the value or state of the data is indeterminate if power is interrupted to system 500).

Peripheral interface 570 may include any hardware interface not specifically mentioned above. Peripherals refer generally to devices that connect dependently to system 500. A dependent connection is one where system 500 provides the software and/or hardware platform on which an operation executes, and with which a user interacts.

FIG. 6 is a block diagram of an embodiment of a mobile device in which memory accesses may be implemented. Device 600 represents a mobile computing device, such as a computing tablet, a mobile phone or smartphone, a wireless-enabled e-reader, or other mobile device. It will be understood that certain of the components are shown generally, and not all components of such a device are shown in device 600.

Device 600 may include processor 610, which performs the primary processing operations of device 600. Processor 610 may include one or more physical devices, such as microprocessors, application processors, microcontrollers, programmable logic devices, or other processing means. The processing operations performed by processor 610 include the execution of an operating platform or operating system on which applications and/or device functions are executed. The processing operations include operations related to I/O (input/output) with a human user or with other devices, operations related to power management, and/or operations related to connecting device 600 to another device. The processing operations may also include operations related to audio I/O and/or display I/O.

In one embodiment, device 600 includes audio subsystem 620, which represents hardware (e.g., audio hardware and audio circuits) and software (e.g., drivers, codecs) components associated with providing audio functions to the computing device. Audio functions may include speaker and/or headphone output, as well as microphone input. Devices for such functions may be integrated into device 600, or connected to device 600. In one embodiment, a user interacts with device 600 by providing audio commands that are received and processed by processor 610.

Display subsystem 630 represents hardware (e.g., display devices) and software (e.g., drivers) components that provide a visual and/or tactile display for a user to interact with the computing device. Display subsystem 630 may include display interface 632, which may include the particular screen or hardware device used to provide a display to a user. In one embodiment, display interface 632 includes logic separate from processor 610 to perform at least some processing related to the display. In one embodiment, display subsystem 630 includes a touchscreen device that provides both output and input to a user.

I/O controller 640 represents hardware devices and software components related to interaction with a user. I/O controller 640 may operate to manage hardware that is part of audio subsystem 620 and/or display subsystem 630. Additionally, I/O controller 640 illustrates a connection point for additional devices that connect to device 600 through which a user might interact with the system. For example, devices that may be attached to device 600 might include microphone devices, speaker or stereo systems, video systems or other display device, keyboard or keypad devices, or other I/O devices for use with specific applications such as card readers or other devices.

As mentioned above, I/O controller 640 may interact with audio subsystem 620 and/or display subsystem 630. For example, input through a microphone or other audio device may provide input or commands for one or more applications or functions of device 600. Additionally, audio output may be provided instead of or in addition to display output. In another example, if display subsystem includes a touchscreen, the display device also acts as an input device, which may be at least partially managed by I/O controller 640. There may also be additional buttons or switches on device 600 to provide I/O functions managed by I/O controller 640.

In one embodiment, I/O controller 640 manages devices such as accelerometers, cameras, light sensors or other environmental sensors, gyroscopes, global positioning system (GPS), or other hardware that may be included in device 600. The input may be part of direct user interaction, as well as providing environmental input to the system to influence its operations (such as filtering for noise, adjusting displays for brightness detection, applying a flash for a camera, or other features).

In one embodiment, device 600 includes power management 650 that manages battery power usage, charging of the battery, and features related to power saving operation. Memory subsystem 660 may include memory device(s) 662 for storing information in device 600. Memory subsystem 660 may include nonvolatile (state does not change if power to the memory device is interrupted) and/or volatile (state is indeterminate if power to the memory device is interrupted) memory devices. Memory 660 may store application data, user data, music, photos, documents, or other data, as well as system data (whether long-term or temporary) related to the execution of the applications and functions of system 600. In one embodiment, memory subsystem 660 includes memory controller 664 (which could also be considered part of the control of system 600, and could potentially be considered part of processor 610) to control memory 662.

Connectivity 670 may include hardware devices (e.g., wireless and/or wired connectors and communication hardware) and software components (e.g., drivers, protocol stacks) to enable device 600 to communicate with external devices. The device could be separate devices, such as other computing devices, wireless access points or base stations, as well as peripherals such as headsets, printers, or other devices.

Connectivity 670 may include multiple different types of connectivity. To generalize, device 600 is illustrated with cellular connectivity 672 and wireless connectivity 674. Cellular connectivity 672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 674 refers to wireless connectivity that is not cellular, and may include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 680 include hardware interfaces and connectors, as well as software components (e.g., drivers, protocol stacks) to make peripheral connections. It will be understood that device 600 could both be a peripheral device ("to" 682) to other computing devices, as well as have peripheral devices ("from" 684) connected to it. Device 600 commonly has a "docking" connector to connect to other computing devices for purposes such as managing (e.g., downloading and/or uploading, changing, synchronizing) content on device 600. Additionally, a docking connector may allow device 600 to connect to certain peripherals that allow device 600 to control content output, for example, to audiovisual or other systems.

In addition to a proprietary docking connector or other proprietary connection hardware, device 600 may make peripheral connections 680 via common or standards-based connectors. Common types may include a Universal Serial Bus (USB) connector (which may include any of a number of different hardware interfaces), DisplayPort including MiniDisplayPort (MDP), High Definition Multimedia Interface (HDMI), Firewire, or other type.

In one implementation, an apparatus comprises a cache memory to couple to a processor, a tag storage, coupled to the cache memory, to store a first set including first tags each associated with a respective data location of the cache memory, and a cache of cache tags to store a subset of tags stored at the tag storage, the cache of cache tags including a first portion and a second portion. The apparatus further comprises a controller coupled to the cache of cache tags, the controller to update the subset of tags based on memory access requests from the processor, wherein in response to any determination that a tag of the first set is to be stored to the cache of cache tags, the controller to store all tags of the first set to the first portion, wherein any storage of tags of the first set to the cache of cache tags by the controller includes storage of the tags of the first set to only the first portion.

In an embodiment, the tag storage is further to store a second set including second tags each associated with a respective data location stored within the cache memory. In another embodiment, in response to any determination that a tag of the second set is to be stored to the cache of cache tags, the controller is to store all tags of the second set to the second portion, wherein any storage of tags of the second set to the cache of cache tags by the controller includes storage of the tags of the second set to only the second portion. In another embodiment, of all set of tags of the tag storage, the first portion is to store only tags of the first set.

In another embodiment, the tag storage comprises a first plurality of sets including the first set, and a second plurality of sets including the second set, wherein, of the first plurality of sets and the second plurality of sets, the first portion is dedicated to only the first plurality of sets and the second portion is dedicated to only the second plurality of sets. In another embodiment, the first plurality of sets correspond to odd sets of the cache memory and the second plurality of sets correspond to even sets of the cache memory. In another embodiment, the cache of cache tags and the processor are located on a first die. In another embodiment, the tag storage structure is located on a second die coupled to the first die.

In another implementation, a method comprises storing at a tag storage a first set including first tags each associated with a respective data location of a cache memory coupled to a processor, storing at a cache of cache tags a subset of tags stored at the tag storage, the cache of cache tags including a first portion and a second portion, and updating the subset of tags based on memory access requests from the processor, wherein in response to any determination that a tag of the first set is to be stored to the cache of cache tags, all tags of the first set are stored to the first portion, wherein any storage of tags of the first set to the cache of cache tags includes storage of the tags of the first set to only the first portion.

In an embodiment, the method further comprises storing at the tag storage a second set including second tags each associated with a respective data location stored within the cache memory, and in response to any determination that a tag of the second set is to be stored to the cache of cache tags, storing all tags of the second set to the second portion. In another embodiment, any storage of tags of the second set to the cache of cache tags by the controller includes storage of the tags of the second set to only the second portion. In another embodiment, of all set of tags of the tag storage, the first portion is to store only tags of the first set.

In another embodiment, wherein the tag storage comprises a first plurality of sets including the first set, and a second plurality of sets including the second set, wherein, of the first plurality of sets and the second plurality of sets, the first portion is dedicated to only the first plurality of sets and the second portion is dedicated to only the second plurality of sets. In another embodiment, the first plurality of sets correspond to odd sets of the cache memory and wherein the second plurality of sets correspond to even sets of the cache memory. In another embodiment, the cache of cache tags and the processor are located on a first die. In another embodiment, the tag storage structure is located on a second die coupled to the first die.

In another implementation, an apparatus comprises a cache of cache tags to store a subset of tags stored at a tag storage, the subset of tags each associated with a respective data location of a cache memory, and a controller including circuitry to associate a first entry of a replacement table with a first set of tags stored to the cache of cache tags, including the controller to set a first variable of the first entry to an initial value of a pre-determined plurality of values. If a first memory access request comprises a tag corresponding to one of the first set of tags, then the controller is further to change the first variable to another of the pre-determined plurality of values to indicate an increase of a level of activity, otherwise, the controller to change the first variable to another of the pre-determined plurality of values to indicate a decrease of the level of activity. In response to a failure to identify any tag of the cache of cache tags which matches a tag of a second memory access request, the controller is further to select a set of tags to evict from the cache of cache tags, including the controller to search the replacement table for a variable which is equal to the initial value.

In an embodiment, in response to any determination that a tag of the first set is to be stored to the cache of cache tags, the controller is to store all tags of the first set to the first portion. In another embodiment, the cache of cache tags and a processor to provide the first memory access request are located on a first die. In another embodiment, the tag storage structure is located on a second die coupled to the first die. In another embodiment, the cache of cache tags contains one or more of the most recently used tags stored in the tag storage structure.

In another implementation, a method comprises, in response to storage of a first set of tags to a cache of cache tags, associating a first entry of a replacement table with the first set of tags, including setting a first activity variable of the first entry to an initial value of a pre-determined plurality of values, wherein a tag storage stores tags which are each associated with a respective data location of a cache memory, and wherein the cache of cache tags stores a subset of tags stored at the tag storage. The method further comprises, if a first memory access request comprises a tag corresponding to one of the first set of tags, then changing the first activity variable to another of the pre-determined plurality of values to indicate an increase of a level of activity of the first set, otherwise changing the first activity variable to another of the pre-determined plurality of values to indicate a decrease of the level of activity of the first set. The method further comprises, in response to a failure to identify any tag of the cache of cache tags which matches a tag of a second memory access request, selecting a set of tags to evict from the cache of cache tags, including searching the replacement table for an activity variable which is equal to the initial value.

In an embodiment, in response to any determination that a tag of the first set is to be stored to the cache of cache tags, the controller to store all tags of the first set to the first portion. In another embodiment, the cache of cache tags and a processor to provide the first memory access request are located on a first die. In another embodiment, the tag storage structure is located on a second die coupled to the first die. In another embodiment, the cache of cache tags contains one or more of the most recently used tags stored in the tag storage structure.

Techniques and architectures for providing access to cached data are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A method comprising:
in response to storage of a first set of tags to a cache of cache tags, associating a first entry of a replacement table with the first set of tags, including setting a first activity variable of the first entry to an initial value of a pre-determined plurality of values, wherein a tag storage stores tags which are each associated with a respective data location of a cache memory, and wherein the cache of cache tags stores a subset of multiple tags stored at the tag storage, wherein the multiple tags includes the first set of tags; and
if a first memory access request comprises a tag corresponding to one of the first set of tags, then changing the first activity variable to a first value of the pre-determined plurality of values to indicate an increase of a level of activity of the first set, otherwise changing the first activity variable to a second value of the pre-determined plurality of values to indicate a decrease of the level of activity of the first set; and
in response to a failure to identify any tag of the cache of cache tags which matches a tag of a second memory access request, selecting a set of tags to evict from the cache of cache tags, including searching the replacement table for an activity variable which is equal to the initial value.

2. The method of claim 1, wherein in response to any determination that a tag of the first set is to be stored to the cache of cache tags, the controller to store all tags of the first set to a first portion of the cache of cache tags, wherein the cache of cache tags includes the first portion and a second portion.

3. The method of claim 1, wherein the cache of cache tags and a processor to provide the first memory access request are located on a first die.

4. The method of claim 3, wherein the tag storage is located on a second die coupled to the first die.

5. The method of claim 1, wherein the cache of cache tags contains one or more of the most recently used tags stored in the tag storage.

6. An apparatus comprising:
a cache of cache tags to store a subset of multiple tags stored at a tag storage, the tags of the subset each associated with a respective data location of a cache memory; and
a controller including circuitry to associate a first entry of a replacement table with a first set of tags stored to the cache of cache tags, wherein the multiple tags includes the first set of tags, including the controller to set a first variable of the first entry to an initial value of a pre-determined plurality of values,
wherein, if a first memory access request comprises a tag corresponding to one of the first set of tags, then the controller further to change the first variable to a first value of the pre-determined plurality of values to indicate an increase of a level of activity, otherwise, the controller to change the first variable to a second value of the pre-determined plurality of values to indicate a decrease of the level of activity; and
wherein, in response to a failure to identify any tag of the cache of cache tags which matches a tag of a second memory access request, the controller further to select a set of tags to evict from the cache of cache tags, including the controller to search the replacement table for a variable which is equal to the initial value.

7. The apparatus of claim 6, wherein in response to any determination that a tag of the first set is to be stored to the cache of cache tags, the controller to store all tags of the first set to a first portion of the cache of cache tags, wherein the cache of cache tags includes the first portion and a second portion.

8. The apparatus of claim 6, wherein the cache of cache tags and a processor to provide the first memory access request are located on a first die.

9. The apparatus of claim 8, wherein the tag storage is located on a second die coupled to the first die.

10. The apparatus of claim 6, wherein the cache of cache tags contains one or more of the most recently used tags stored in the tag storage.

11. An apparatus comprising:
a cache memory to couple to a processor;
a tag storage, coupled to the cache memory, to store a first set including first tags each associated with a respective data location of the cache memory;
a cache of cache tags to store a subset of multiple tags stored at the tag storage, the multiple tags including the first set, the cache of cache tags including first storage locations and second storage locations other than the first storage locations; and
a controller coupled to the cache of cache tags, the controller to update the subset of tags based on memory access requests from the processor, wherein in response to any determination that a tag of the first set is to be stored to the cache of cache tags, the controller to store all tags of the first set to the first storage locations, wherein any storage of tags of the first set to the cache of cache tags by the controller includes storage of the tags of the first set to only the first storage locations.

12. The apparatus of claim 11, the tag storage further to store a second set including second tags each associated with a respective data location stored within the cache memory.

13. The apparatus of claim 12, wherein in response to any determination that a tag of the second set is to be stored to the cache of cache tags, the controller to store all tags of the second set to the second storage locations, wherein any storage of tags of the second set to the cache of cache tags by the controller includes storage of the tags of the second set to only the second storage locations.

14. The apparatus of claim 11, wherein, of all sets of tags of the tag storage, the first storage locations are to support tag storage only on behalf of the first set.

15. The apparatus of claim 12, wherein the tag storage comprises:
a first plurality of sets including the first set; and
a second plurality of sets including the second set;
wherein, of the first plurality of sets and the second plurality of sets, the first storage locations are dedicated to only the first plurality of sets and the second storage locations are dedicated to only the second plurality of sets.

16. The apparatus of claim 15, wherein the first plurality of sets correspond to odd sets of the cache memory and wherein the second plurality of sets correspond to even sets of the cache memory.

17. The apparatus of claim 11, wherein the cache of cache tags and the processor are located on a first die.

18. The apparatus of claim 17, wherein the tag storage is located on a second die coupled to the first die.

19. A method comprising:
storing at a tag storage a first set including first tags each associated with a respective data location of a cache memory coupled to a processor;
storing at a cache of cache tags a subset of multiple tags stored at the tag storage, the multiple tags including the first set, the cache of cache tags including first storage locations and second storage locations other than the first storage locations; and
updating the subset of tags based on memory access requests from the processor, wherein in response to any determination that a tag of the first set is to be stored to the cache of cache tags, all tags of the first set are stored to the first storage locations, wherein any storage of tags of the first set to the cache of cache tags includes storage of the tags of the first set to only the first storage locations.

20. The method of claim 19, further comprising:
storing at the tag storage a second set including second tags each associated with a respective data location stored within the cache memory; and
in response to any determination that a tag of the second set is to be stored to the cache of cache tags, storing all tags of the second set to the second storage locations.

21. The method of claim 20, wherein any storage of tags of the second set to the cache of cache tags by the controller includes storage of the tags of the second set to only the second storage locations.

22. The method of claim 19, wherein, of all sets of tags of the tag storage, the first storage locations are to support tag storage only on behalf of the first set.

23. The method of claim 20, wherein the tag storage comprises:
a first plurality of sets including the first set; and
a second plurality of sets including the second set;
wherein, of the first plurality of sets and the second plurality of sets, the first storage locations are dedicated to only the first plurality of sets and the second storage locations are dedicated to only the second plurality of sets.

24. The method of claim 23, wherein the first plurality of sets correspond to odd sets of the cache memory and wherein the second plurality of sets correspond to even sets of the cache memory.

25. The method of claim 19, wherein the cache of cache tags and the processor are located on a first die.

26. The method of claim 25, wherein the tag storage is located on a second die coupled to the first die.

* * * * *